United States Patent [19]

Bender et al.

[11] Patent Number: 5,576,946
[45] Date of Patent: Nov. 19, 1996

[54] ICON BASED PROCESS DESIGN AND CONTROL SYSTEM

[75] Inventors: Martin P. Bender, Naperville; James P. McAndrew, Aurora, both of Ill.

[73] Assignee: Fluid Air, Inc., Aurora, Ill.

[21] Appl. No.: 554,871

[22] Filed: Nov. 7, 1995

Related U.S. Application Data

[63] Continuation of Ser. No. 129,656, Sep. 30, 1993, abandoned.
[51] Int. Cl.$^6$ ............................. G06F 17/00; G06F 17/50
[52] U.S. Cl. ...................... 364/146; 364/188; 364/474.22
[58] Field of Search ............................... 364/551.01, 468, 364/474.01, 474.11, 474.12, 474.22–474.24, 474.26, 146, 147, 148, 188, 510; 395/800, 700, 140, 161, 159

[56] References Cited

U.S. PATENT DOCUMENTS

| | | | |
|---|---|---|---|
| 4,443,861 | 4/1984 | Slater | 364/900 |
| 4,742,467 | 5/1988 | Messerich et al. | 395/700 |
| 4,813,013 | 3/1989 | Dunn | 395/159 |
| 4,852,047 | 7/1989 | Lavallee et al. | 364/191 |
| 4,860,204 | 8/1989 | Gendron et al. | 395/140 |
| 4,908,746 | 3/1990 | Vaughn | 364/147 |
| 5,006,992 | 4/1991 | Skeirik | 364/513 |
| 5,122,717 | 6/1992 | Hayashi | 364/474.01 X |
| 5,134,560 | 7/1992 | Ferriter et al. | 364/188 |
| 5,168,441 | 12/1992 | Onarheim et al. | 364/146 |
| 5,247,693 | 9/1993 | Bristol | 395/800 |
| 5,301,336 | 4/1994 | Kodesky et al. | 395/800 |
| 5,315,530 | 5/1994 | Gerhardt et al. | 369/510 |
| 5,325,481 | 6/1994 | Hunt | 395/159 |
| 5,392,207 | 2/1995 | Wilson et al. | 364/146 X |

OTHER PUBLICATIONS

Publication: "Software Products For Industrial Automation," Iconics, Inc., 1993.

*Primary Examiner*—Emanuel T. Voeltz
*Assistant Examiner*—M. Kemper
*Attorney, Agent, or Firm*—Bullwinkel Partners. Ltd.

[57] ABSTRACT

A control system for creating, modifying, initiating and controlling a manufacturing process is provided using computer on-screen icons as metaphors for actual process steps. The icons are selected on-screen from a library of icons, and are selectively inserted in, appended to, edited or deleted from the manufacturing process. Each icon represents a discrete process step including associated default-value physical parameters, which may be modified (edited) within predetermined boundary limits. Using the icons, the physical manufacturing process is symbolically assembled on-screen and saved to a storage medium from which it is accessed for use. During actual operation, the manufacturing process is displayed on-screen in an animated graphic representation, with real-time presentation of instantaneous parameter values. The control system also selectively provides on-screen trend graphs showing in strip-chart form the recent history of selected process variables. Other features provide on-screen execution and control of start-up, operation, alternative operation, suspended operation (park), shut-down, and servicing functions.

4 Claims, 10 Drawing Sheets

ON-SCREEN MENU STRUCTURE

| MAIN MENU | SUB-MENUS |
|---|---|
| BUILD PROGRAM | CREATE |
| | EDIT |
| |     PROGRAM |
| |         APPEND ICON |
| |         INSERT ICON |
| |         DELETE ICON |
| |         CHANGE SETTINGS |
| |     AUTO REPORT |
| |         ADD |
| |         REMOVE |
| | SAVE |
| | DELETE |
| | COPY |
| | PRINT |
| | MAIN MENU |
| | |
| RUN PROGRAM | STATUS |
| |     START |
| |     ALT (ALTERNATE) |
| |     SHUTDOWN |
| |     PARK |
| |     SERVICE |
| |     HOLD |
| |     RELEASE |
| | LOAD |
| | TREND |
| |     MAGNIFY |
| |         ACCEPT CHANGES |
| |         END MAGNIFY |
| |         HOLD |
| |         RELEASE |
| | MAIN MENU |
| | |
| SETUP | MAIN MENU |
| | SAVE |
| | DELETE |
| | |
| BATCH HISTORY | PRINT LIST |
| | PRINT REPORT |
| | ARCHIVE |
| | DELETE |
| | MAIN MENU |
| | |
| SHUTDOWN FACTROL | |

ICON BASED PROCESS DESIGN AND CONTROL SYSTEM

This is a continuation of application Ser. No. 08/129,656 filed Sep. 30, 1993, now abandoned.

BACKGROUND OF THE INVENTION

This invention relates generally to the control of manufacturing equipment and processes, and more specifically to the use of a digital computer and associated software which creates a graphical, icon-driven user interface for creating, editing, saving, compiling, recalling, downloading, executing, monitoring and controlling manufacturing equipment and processes.

Manufacturing processes, by definition, consist of a series of sequential or concurrent steps, each step involving one or more actions to be taken by a machine or machines. The steps may occur at specific times and in a specified sequence according to specific parameters, or may occur in response to specific events. Each step may have one or more elements, each element describing activities or operations with greater specificity.

A manufacturing process can be represented as a tabular construct, known as a ladder diagram, which displays each of the steps with its associated elements and parameters. Until very recently, the construction of ladder diagrams was the way most processes were designed and specified.

Manufacturing equipment is commonly controlled directly by interfacing with a programmable logic controller, or "PLC". The PLC actuates output modules of the manufacturing equipment in response to physical stimuli which the PLC is programmed by the operator of the system to recognize. PLC's are usually programmed using either ladder logic or sequential function charts. Because of the inherent complexity of ladder logic, programming of PLCs has traditionally been difficult, time consuming and error-prone.

Ladder language programs are particularly difficult to adapt or change once completed and compiled for execution. In other words, once a process is defined, the PLC thereafter controls the machinery strictly, according to the program, and the system does not easily lend itself to adjustment or adaptation in response to changed or unexpected conditions.

Manufacturers have long sought to take advantage of the greater flexibility of general-purpose computers, including inexpensive commercially available personal computers (PCs), to enhance the efficiency of establishing and maintaining control of manufacturing processes. General-purpose computers can be programmed in high level commercially available programming languages such as BASIC, FORTRAN or, more recently, C, or in object-oriented languages such as C++. The power of the higher-level languages themselves allows the creation of more complex application programs.

Ideally, process control applications should be able to handle the most critical requirements of process control, which include:

a. Creating and maintaining machine-readable instructions to control a process (process editing);

b. Compiling or creating an executable program from the instructions written by the process editor (compiling the process instructions);

c. Executing the instructions to actually control the machinery, and monitoring and reporting on the process; and d. Communicating data and information concerning the process to other business systems.

Software written for general purpose computers has addressed each of these aspects of the process control problem, but with varying degrees of success. Prior art programs allow the creation of a process control protocol through process editing, and most allow the compilation of such batch control instructions into an execution module. Most such programs also allow an operator to monitor the progress of an ongoing process in real-time by displaying information about the process, either in tabular or graphical form, on an output terminal device such as a printer or video display terminal (VDT) screen. Many programs also facilitate the passing of process data to and from other business systems. However, these existing programs are unable to perform the kind of quick and easy icon based process editing achieved by the present invention.

For process editing, much existing software uses ladder logic, or an advanced version of it, to reproduce on the screen the tabular construction of the process. In order to create a control program for a new process, or to modify the program for a previously created process, an operator typically must enter input parameters, instructions or information into the process editor by typing information into a tabular arrangement of numbers on the screen, similar to filling out a form. Accuracy in doing so is obviously critical to the success of the manufacturing process. However, screens organized in such a way are difficult for operators to work with, and errors are common. The inherent complexity of ladder logic itself remains a further source of batch creation errors.

The prior art also includes techniques for the manipulation of graphical representations ("icons") by the use of a mouse or other pointing device. This feature is common in general-purpose operating shell programs as Windows, UNIX and OS/2, and their associated application programs. (Windows is a trademark of Microsoft Corporation; UNIX is a trademark of Novell, Inc.; and OS/2 is a trademark of International Business Machine Corporation.)

The system of screens which the program presents to the operator, and with which the operator interacts, is referred to as the "user interface". Programs which provide a graphical user interface are said to provide the operator with a "graphical environment", or "graphical working environment". This graphical environment has now become the standard for many commercial programs, and for the current generation of computer programmers and users.

In most graphical interfaces, each screen icon represents a discrete series of individual instructions, functions, actions or values. Manipulation of the icon by the operator in some way, by "clicking" on it with a mouse for example, allows the operator to perform an operation on the whole series represented by that icon. In most graphical environments the icon may be moved ("dragged") from one screen area to another if the mouse key is depressed and held on the icon while the mouse is moved around the screen. As a result, the entire series represented by the icon can be inserted into another screen area, and thereby into another point in the program. Similarly, in many windowing environments, when the operator clicks the mouse twice on a program icon the computer executes all of the instructions the icon represents.

Despite the existence of these prior art techniques, only limited use of graphical representations has been made by existing process control software. Significantly, no commercially available process control program yet offers the process operator a series of graphical representations, or icons, of process steps and elements which the operator can manipulate on-screen in order to create or modify a process in the process editing phase. Thus a need exists for process control software which presents a graphical environment to an operator in the process editing phase. Such an interface would reduce training requirements, improve clarity and reduce operations errors during execution.

An early attempt to provide such a process editor is disclosed in Slater U.S. Pat. No. 4,443,861. This patent discloses a process editor which compiles instruction sets and parameters into functional program blocks. The operator enters instruction sets or variables into the editor by keying in a control function and providing appropriate device tags or identifiers. Changes to existing programs are accomplished by recalling the program code by line number and then keying in the change. Once all instruction sets and values are entered, the process program is compiled and executed. Cumbersome though such a procedure may be, it did foreshadow more advanced applications which were to follow.

A more advanced application is shown in the Continuous Flow Chart, Data Format and Debugging System of Lavallee, U.S. Pat. No. 4,852,047. The process editing aspect of this program provides the operator the ability to document a process by entering numerical or textual parameters to the program, which then produces and displays a continuous multiple block flow chart of the end process and provides an enhanced debugging feature. The primary data entry device for the operator or programmer is the keyboard. However, only a few limited, primitive flowchart symbols are displayed, in either the editing or monitoring phase, with some flowchart symbols representing groups of other symbols. Still, the ability to utilize even primitive and basic flowchart symbolism was an improvement over the software which had preceded this patent.

The Industrial Control System of Vaughn U.S. Pat. No. 4,908,746 incorporates modular "open bus" software which is also utilized by the present invention. This patent discloses process configuration tables reproduced on the computer screen. The system programmer programs the operation of the task by typing information into the a tabular screen arrangement similar to filling in a form. This software is larger in scope than that disclosed in the LaVallee '047 patent in that it includes modules by which the operator can create animated symbolic representations (not icons) which can be used in monitoring the ongoing process. The emphasis of the invention is the use of a central database to pass parameter values between modules. One commercial advertisement for this software discloses that it uses an animation editor by which the operator can create a moving pictorial representation of the process.

The Process Control System with Reconfigurable Expert Rules and Control Modules of Skeirik U.S. Pat. No. 5,006,992 incorporates multiple levels of programs directed by (or "running beneath") a supervisor program. One of the associated program levels of this patent provides a database, and at another level is a process editor. The twin objectives of the '992 patent are its use of artificially intelligent "expert" procedures for both the creating and debugging processes. However, according to this prior art patent, the creation of a process requires the operator to enter information in numerical or text format directly into a tabular construct on a screen, similar to the earlier software described above.

Other typical commercially available software includes the program sold under the name Dataplus (a trademark of Glatt Air Techniques, Inc.). This software product also has a batch creation feature, but it also suffers from the need to enter data into on-screen tabular constructions.

Thus, although earlier process control software has made use of graphical displays, the primary use of graphics has been in the process monitoring function. Use of a graphical working environment in the process editing stage has been limited or nonexistent. An editor in which groups of icons, representing preprogrammed functions and values, can be manipulated and arranged on-screen by an operator using a pointing device, is not disclosed or suggested. Such an editor would limit the potential for error in the process creation and maintenance phase. Also, in such an environment, processes could be assembled by operators who are not programming experts. In addition, such a process control system would reduce the requirement for later extensive debugging and would facilitate the maintenance of process programs.

SUMMARY OF THE INVENTION

The present invention is an icon-based process design and control system which uses general purpose computer software featuring an intuitive, graphical, icon-driven interface. By this means, the ability of a process operator to create, edit, monitor and control ongoing manufacturing processes is substantially enhanced, and the complexity of operation and programming training of prior art control systems is reduced or eliminated. The process control system of the present invention includes means for selecting preprogrammed icons from a video display terminal screen (each icon representing a manufacturing process step and its associated variable parameters); means for selecting and manipulating the selected icons to establish the order in which the steps of a manufacturing process are carried out; means for specifying and changing the variable parameters associated with each manufacturing process step; means for monitoring process status information for each of the process steps on the video screen; and means for interpreting the process status information to control each of the manufacturing process equipment elements.

An overall object of the present invention is to provide improved icon-based process control software which can run on general purpose personal computers.

A further object is to provide a method by which manufacturing processes may bet easily created, edited, controlled, monitored and reported upon by the system operator.

Another object is to provide process control software which makes use of a symbolic graphic video display in the editing stage to provide an intuitive graphical working environment within which icons are manipulated on the screen to create or edit a process.

A further object is to provide the operator with the capability to selectively modify selected operating parameters within the process steps represented by the above-mentioned icons.

Another object of the invention is to provide a means by which a process control system can communicate or pass information to and from other business systems.

An additional object of the invention is to provide a process control system which can utilize and operate on multiple commercially available computer operating system software.

DETAILED DESCRIPTION OF THE INVENTION

The present invention is a manufacturing process control system which can be used to create icons which may then be manipulated to form a discrete series of defined process steps, referred to herein as a recipe. Each step may consist of one or more actions, with associated variable parameters (time, pressure, temperature, flow rate, etc.) and constants. Each step comprises, therefore, a database in itself. Each individual step database is represented to the operator as an icon on the screen. Each icon therefore symbolizes a discrete database. The present invention uses industry standard database formats for this purpose.

Figure 1:
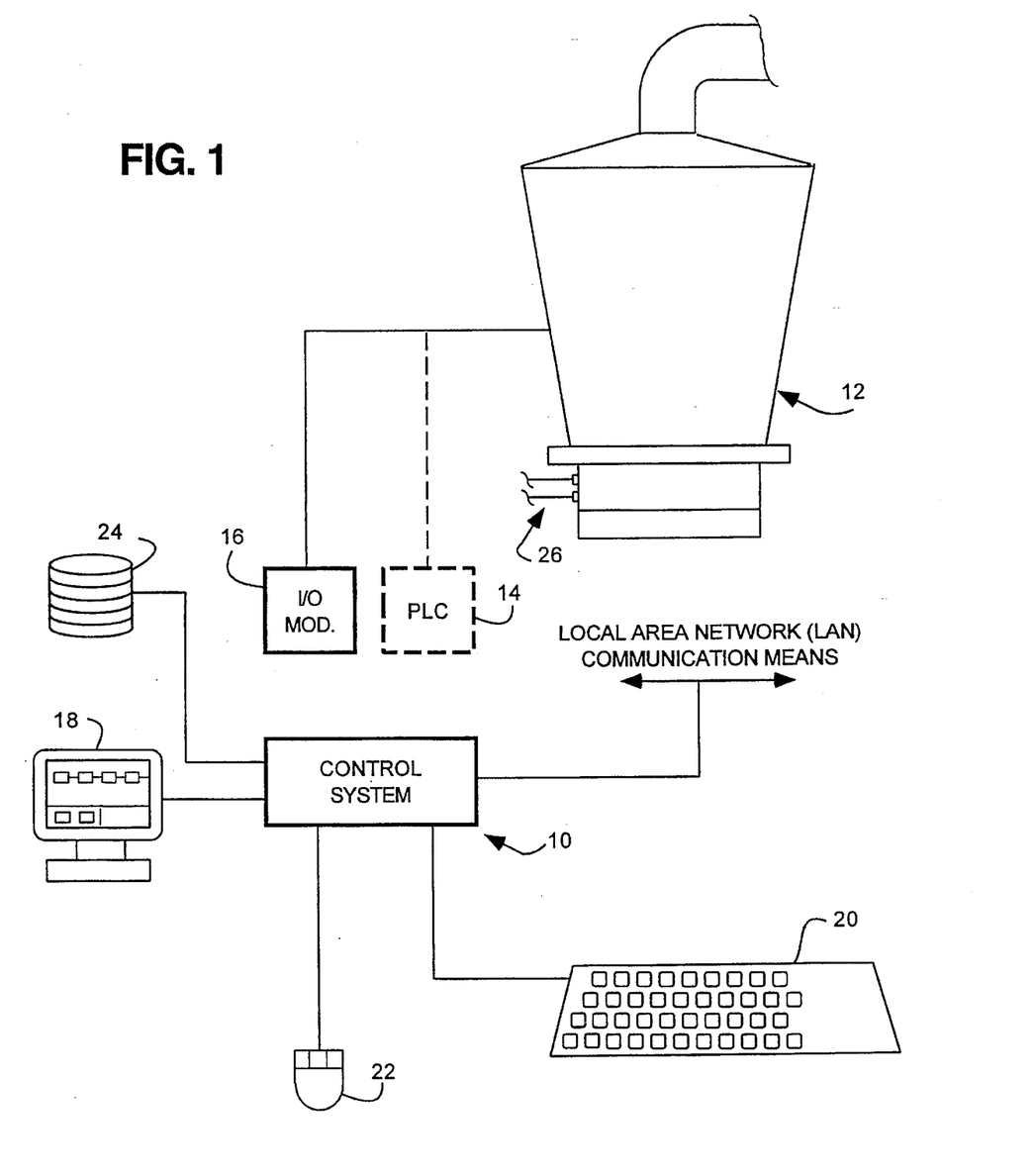
FIG. 1 is a diagrammatic representation of the control system of the present invention indicating in block-diagram form the interrelationship between the control system, the visual display device, data storage, and the manufacturing process equipment.

Referring to FIG. 1, a process control system 10 is shown in schematic form, connected to its associated manufacturing process equipment 12 which for purposes of illustration consists of an industrial batch dryer/agglomerator, such as is used in processing foodstuffs and pharmaceuticals. Process control system 10 interfaces with the process equipment 12 either through a programmable logic controller 14 (as shown in broken lines), or through an input/output module 16.

The process control system 10 consists, in the preferred embodiment, of a conventional PC using an Intel 386 or 486 series microprocessor, and running the specialized software of the present invention as is described in detail below. In the preferred embodiment, the software of the invention runs "on top of" (in operational co-relationship with) three other commercially available software programs: Microsoft Corporation's DOS 5.0 (operating system); Quarterdeck's DESQview and QUEMM 386 multitasking and memory management extension for DOS 5.0; and U.S. Data's Factorylink 3.1 Runtime (application enabler). However, the process control system 10 does not require the user to enter or manipulate the latter programs except for troubleshooting. In other words, the latter programs remain "transparent" to the user in normal operation while using the invention.

The control system 10 includes specialized software according to the present invention, which software is comprised of a Process Editor Module, a Compiler Module, and an Execution or Run Module.

The Process Editor Module enables the operator to use the graphical interface to maneuver and control the step icons in order to link the step databases into a larger collective database (FIG. 2) representing the entire manufacturing process as performed by the equipment 12. In practice, a set of customized icons is first prepared to represent each of the individual operations of which the process equipment 12 is capable. In effect, the icons serve to logically separate and compartmentalize the process into its discrete components. Each of these components represents a real world function of the equipment 12 which is easily recognized and understood by an operator.

Figure 3:
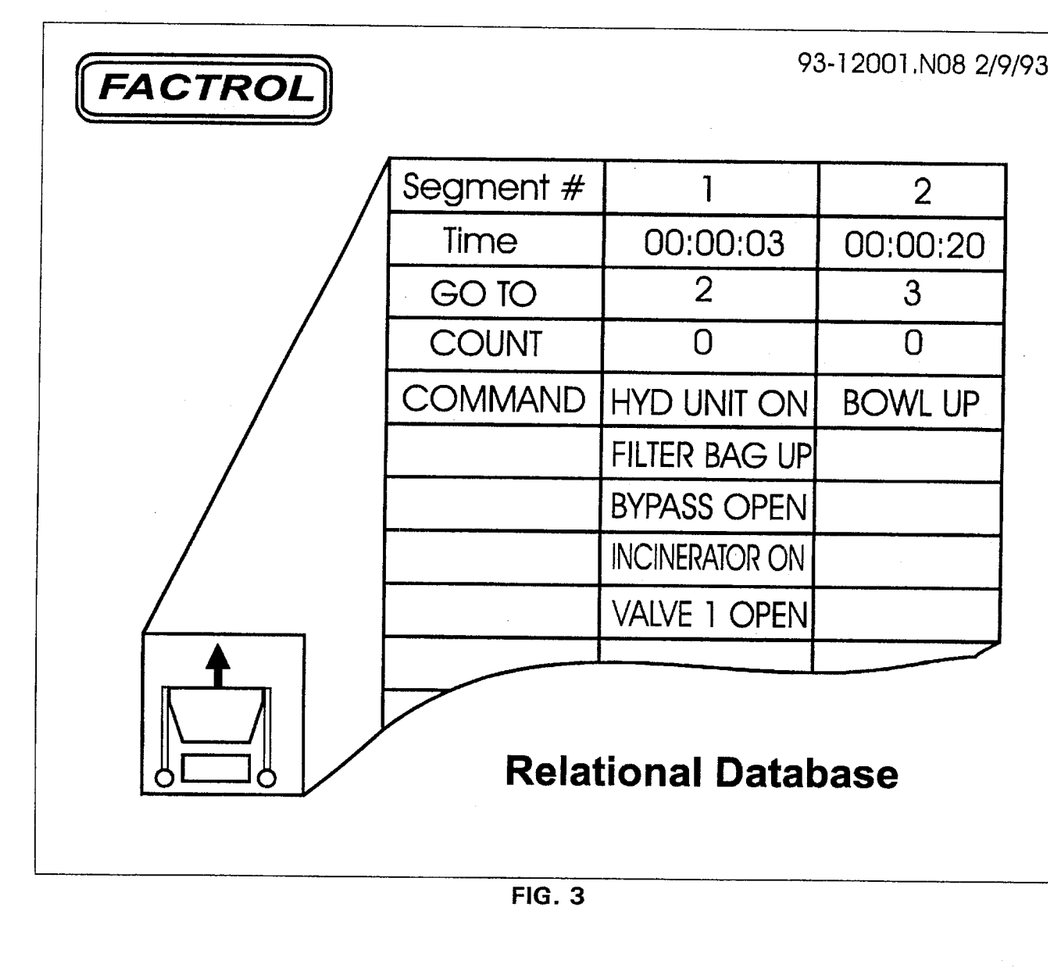
FIG. 3 is a representation of a step icon, illustrating how each step icon symbolizes a discrete relational database consisting of one or more actions, with associated variable parameters and constants.

Further, as illustrated in FIG. 3, each icon also symbolically represents a discrete set of machine-control instructions and associated parameters such as process actuation signals or limit values for operating parameters such as time, temperature and pressure. These instructions and values may typically include broad categories of information and instruction, such as events, process variables, set points, loops, sequence times, cycle increments, input/output (I/O) instructions, and "go to," "input" or "interface" instructions. Some values are variable, but nearly all have default values which are automatically set by the program unless intentionally overridden by the operator.

The available step icons are predetermined within the process control program for the particular physical process equipment 12 to be controlled, and are presented to the operator in an array on the screen 18. The icon figure typically suggests the step in the process which it symbolizes and represents, as shown by the DRY, GRANULATE, COAT and COOL icons shown as typical examples in FIG. 5.

By using a keyboard 20, a mouse 22 or other pointing device such as a trackball or joystick, the operator can manipulate the icons. It should be noted that because of the entirely graphical nature of the operator interface, in many applications the conventional computer keyboard may be dispensed with altogether.

According to the invention, when in the EDIT PROGRAM screen (FIG. 5), and using the pointing device, the operator selects a desired icon and "drags" it or otherwise places it into the desired order on the screen 18 relative to other selected icons. If an icon happens to represent a physical or mathematical variable, the default values may either be accepted or edited by the operator at the time the icon is selected.

Figure 2:
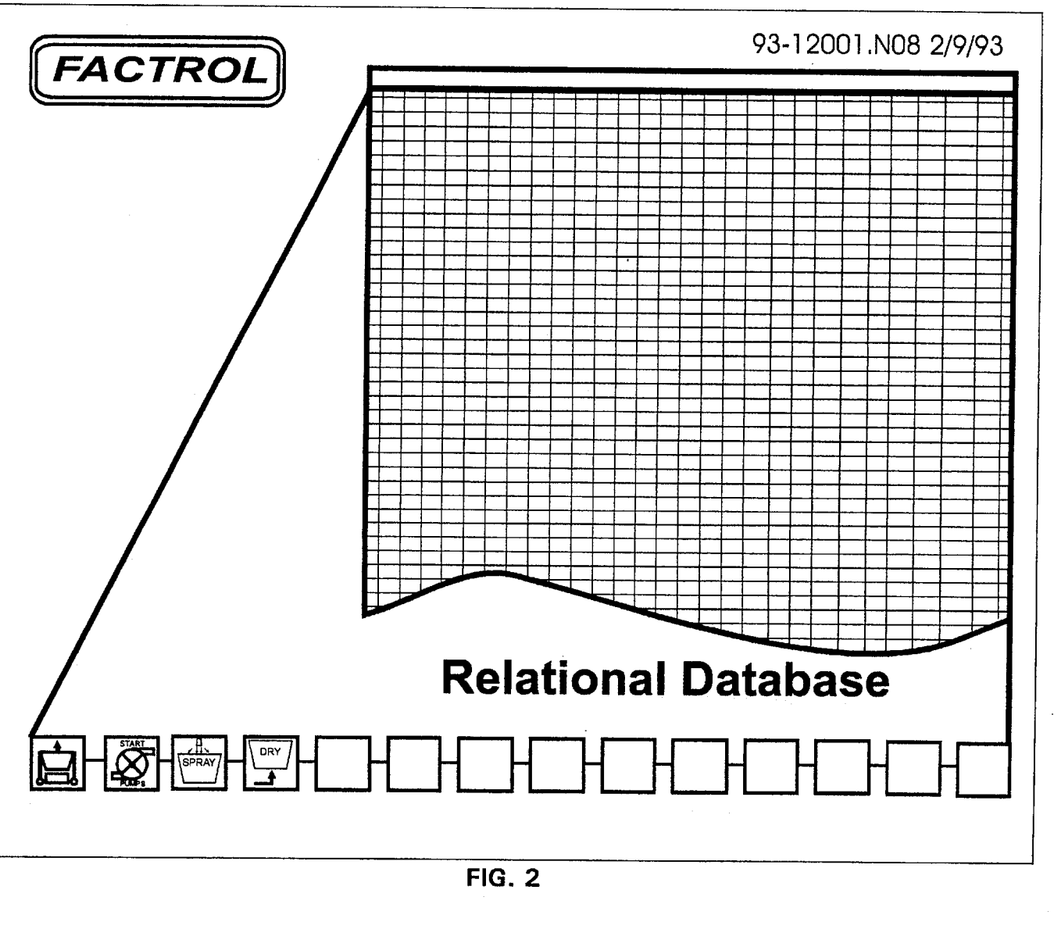
FIG. 2 is a representation of a series of interconnected step icons, each icon representing a discrete database, illustrating how the linked step databases form a larger collective relational database representing an entire manufacturing process.

When the operator has finished selecting the step icons to be used, and has edited them (if required) and placed them in the proper order, the Compiler Module of the invention compiles the step icons into a control program, or strategy. It is of course possible to select, edit and use a single icon multiple times in the same process, such as (for example) icons representing the steps of heating or cooling. As a result, the individual multiple-step databases represented by the individual icons are thus combined into a single database representing the entire process (FIG. 2).

The resulting database is preferably created and stored in any industry standard database format. The use of such standard database formats by the process control software allows simplified access and use or transfer to other business systems. The resulting process database can be saved and stored on a magnetic data storage device 24 such as a hard (fixed) disk drive or cartridge tape drive, and later recalled for editing, compiling or execution. When compiled, the resulting code can be used together with in conjunction with general purpose sensing and control devices 26, and thereby yields a convenient and flexible control system which can also be used as a stand-alone Batch Controller with communication capability to other business systems through conventional data transfer networks.

Alternatively, the control system 10 can be used without sensing and control devices 26 as a Supervisory Controller and Data Acquisition (SCADA) station, from which an operator can control multiple Batch Controllers or PLCs.

When utilized as a Batch Controller, the Run Module enables the operator to control the entire manufacturing process. First, it executes the compilation, and then it provides real-time monitoring of the ongoing process results. The Run Module further provides an overview screen that displays for the operator the instantaneous status of all equipment, the current process variables in use, and the current location of the program in the overall program sequence.

As a feature of the invention, the physical process being carried out in the equipment 12 is also represented in real time on the screen by an animated graphical representation of the actual physical equipment. Alarm conditions are displayed and alarms are logged as they occur. This program module also provides for the gathering and trending of data from the ongoing process.

In its SCADA configuration, the control system 10 of the invention also provides for full distributed control of a network of processing units. The control system functions to provide the operator with supervisory and management information, along with the capability to transfer data and information to central Computer Integrated Manufacturing (CIM) systems via industry standard networks.

In another embodiment, the present invention can be a modular add-on program supplementing existing general purpose factory control software, whereby multiple applications are enabled to be carried out on multiple computers.

The control system 10 provides for the communication and sharing of data and information between modules via local area network (LAN) or wide area network (WAN) communication means. Preferably, this communication capability is also utilized to communicate with other business systems.

It should be noted that the actual programming of the source code for the control program of the present invention is well within the capability of a skilled software writer having ordinary skill in the art of writing computer application programs in commercially available high-level programming languages. The control system program of the present invention was written in the C programming language, but any suitable programming language may be used instead.

More particularly, each of the individual steps or subroutines such as displaying an icon, selecting and dragging an icon into a symbolic operational relationship with other icons, naming and saving the icon as a sub-database, and naming and saving the total recipe (to name just a few examples) is already a well-known technique in the programmer's art.

Figure 4:
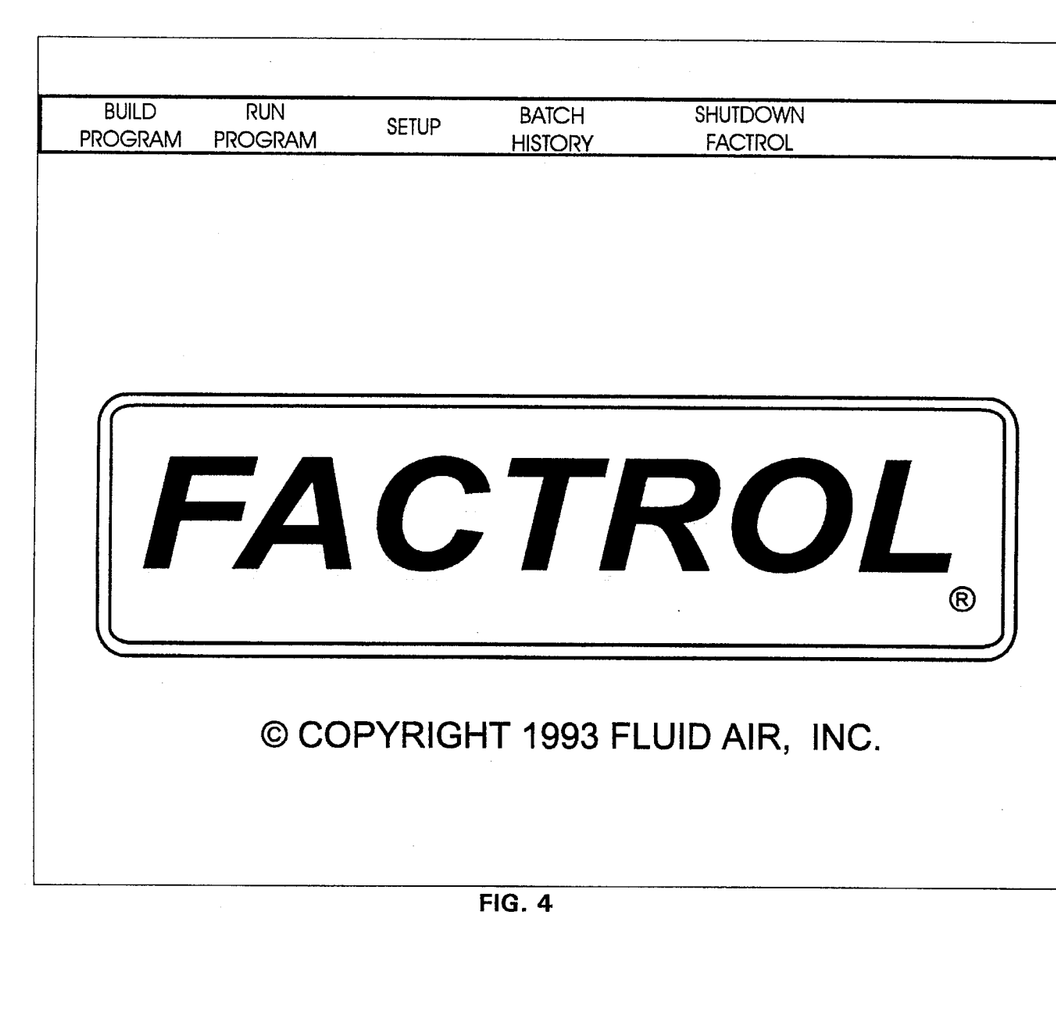
FIG. 4 is a representation of the main menu screen of the present invention, ready for the operator to select the BUILD PROGRAM function.

The present invention is used in the following manner. Upon initially powering up the computer, the control system automatically "boots up" the operating system and windowing system, whereupon a Main Menu screen appears (FIG. 4). By selecting the Set Up option from the upper menu bar, the operator can, if desired, select a password restricting access to other control system users.

Step 1: Creating/Editing the Recipe

In practicing the invention, the operator first selects from the menu bar of the Main Menu screen (FIG. 4) the Build Program option to create, store, or change the manufacturing process which is referred to herein as a recipe. Recipes are given file names for data storage, retrieval and use. When selected from the menu bar, the selected item "lights up" in reverse video, or otherwise changes to indicate selection.

Figure 5:
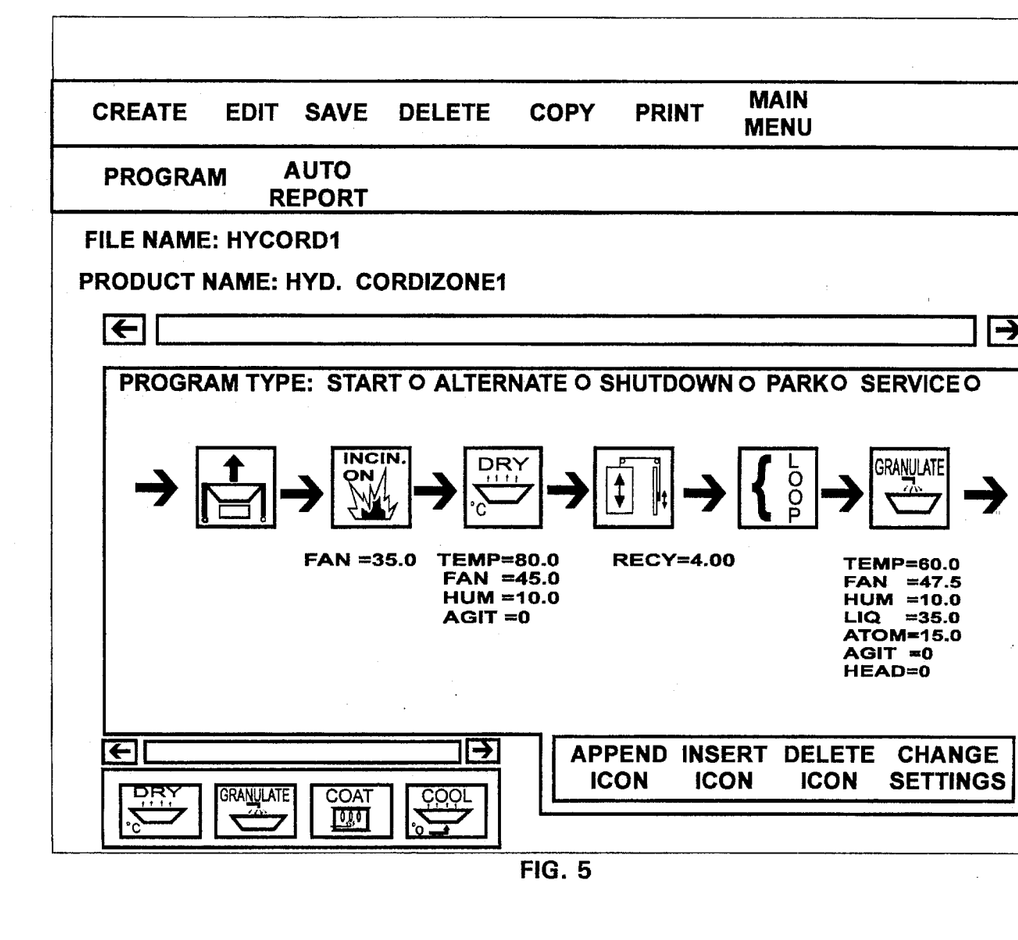
FIG. 5 is a representation of the BUILD PROGRAM, EDIT PROGRAM function screen of the present invention, showing a chain of process steps, or recipe, ready for the operator to edit the recipe.

A recipe can be created or edited from the Edit Program screen (FIG. 5). When creating a recipe, the operator selects the desired process step from the scrolling library located in the lower left of the screen and drags or otherwise locates it in its proper place and order on the screen. Additional process steps, each represented by an icon, may be inserted in or deleted from the recipe using the editing commands shown in the lower right of the edit program screen of FIG. 5.

As the recipe is created, the icons are arranged by the operator to appear in a chained sequence across the computer screen, connected by arrows designating the directional sequence of events. Preferably, when an icon is selected for insertion, appending or deletion, it is identified on the screen in the preferred embodiment by a contrasting color or other appropriate designator.

A program or recipe created in this way may be one of several different program types: a start program, an alternate program, a shutdown program, a park program, or a service program. Each of these programs may be assembled by the operator in advance of running the process, and then saved and edited later prior to use.

Step 2: Selecting/Changing Parameters

Figure 6:
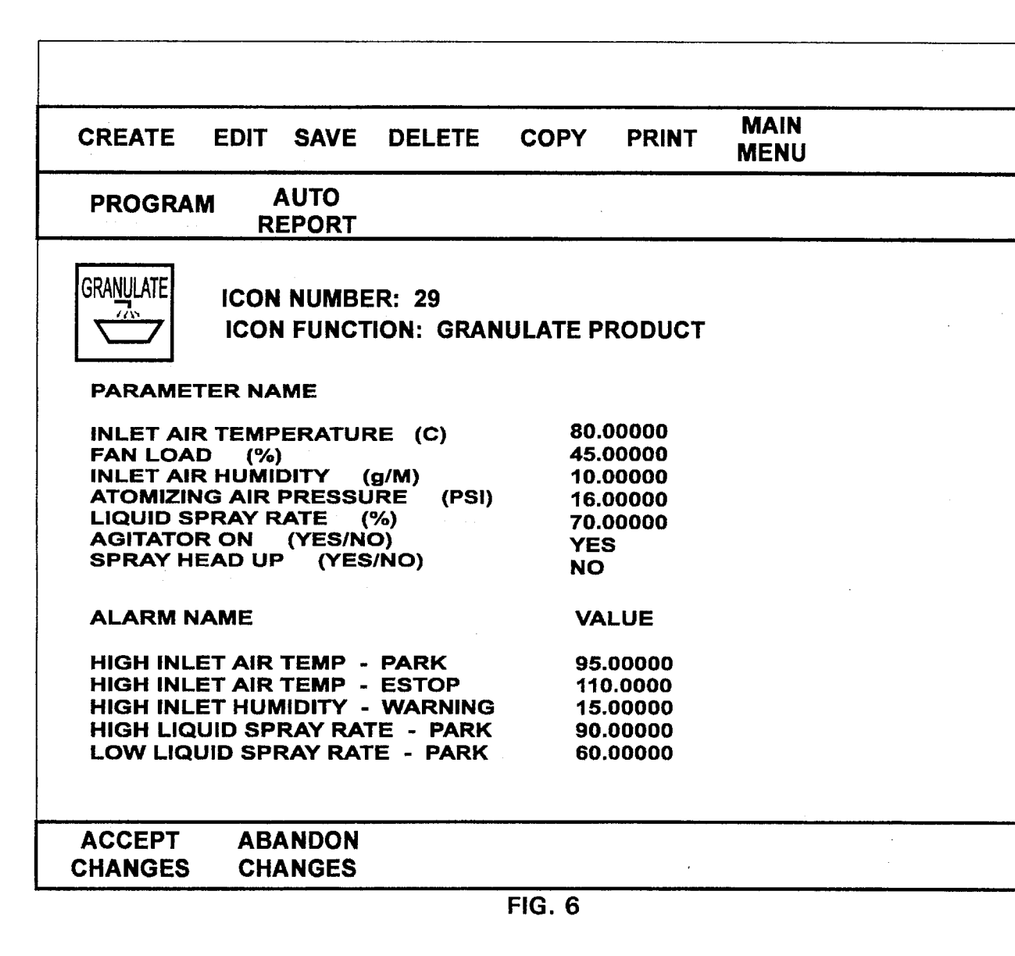
FIG. 6 is a representation of the program parameter edit screen of the EDIT PROGRAM function of the present invention, ready for the operator to change parameter values, if desired.

Each time a new icon is selected for addition to the recipe, a new screen appears as shown in FIG. 6 which displays the default status of the process step represented by that icon, and enables the user to review and edit its parameters. For illustrative purposes, FIG. 6 shows the "GRANULATE" icon, which because of its physical process embodiment requires the selection of parameters including inlet air temperature, fan loop percentage, inlet air humidity, atomizing air pressure, liquid spray rate, agitation (on or off), and spray head position (up or down).

Each of the parameter values or choices in the PARAMETER NAMES table initially appears as a pre-set default value, and each is thereafter capable of being edited or modified by the operator. The ranges of possible modification of each icon-represented process step are, of course, bounded within the program to agree with the safely achievable physical limits of the process step itself.

Similarly, default values appear under the ALARM NAME table which will direct the system to alert the operator to a possible malfunction, and these can either be left at their default values, or modified within the boundaries permitted by the program in consideration of the physical limitations of the equipment itself.

Step 3: Saving the Program

After the program has been created, or an existing program modified through editing, it is saved by the operator by clicking the pointing device on the SAVE command in the menu line. When a program is thus saved, a second window (not shown) appears on the screen confirming to the operator that the save is occurring and indicating when the save is has been successfully completed.

Step 4: Loading the Program

Figure 7:
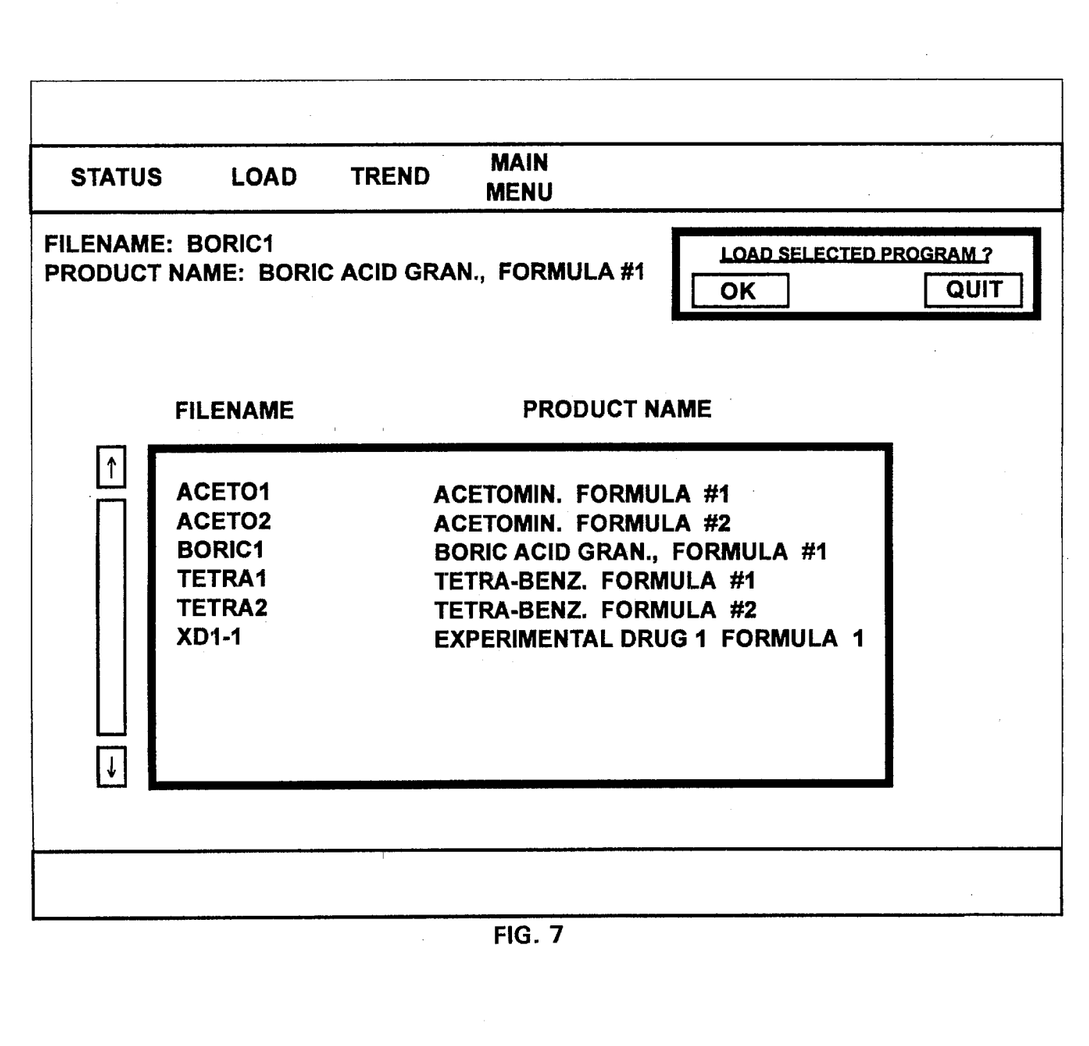
FIG. 7 is a representation of the RUN PROGRAM, LOAD PROGRAM function screen of the present invention, ready for the operator to select a program to be loaded and run.

After returning to the Main Menu (FIG. 4), the RUN PROGRAM command is used to select and load a recipe, to run the recipe on the process equipment. FIG. 7 shows the control system screen in the LOAD PROGRAM mode.

To load a program, the operator clicks on the LOAD command (FIG. 7) while in the Load Program mode. Activating the LOAD command causes the computer to compile the selected program and prepare the run module to command and control the physical equipment by which the process is actually carried out.

Step 5: Starting the Program

As previously noted, there are five types of programs that can be started. The START, ALTERNATE, and SHUTDOWN programs are started by using the commonly employed programming technique of using a pointing device to click on (activate) symbolic control buttons on a graphical control panel (not shown). The invention is of course not limited to these particular programs.

The PARK command executes a sub-program to cause a temporary halt in the process. It is either self-initiated by the program by the activation of an alarm condition because a parameter exceeds a pre-set value, or it may be manually initiated by the operator by selecting the on-screen PARK command. While in PARK mode, a SERVICE program for effecting some service function to the equipment (clearing a clogged spray nozzle, for example) can be started by the operator by selecting a RUN SERVICE command (not shown). Finally, an EMERGENCY STOP function may be manually activated (like the PARK function), or it may be automatically activated by an alarm trip.

Figure 8:
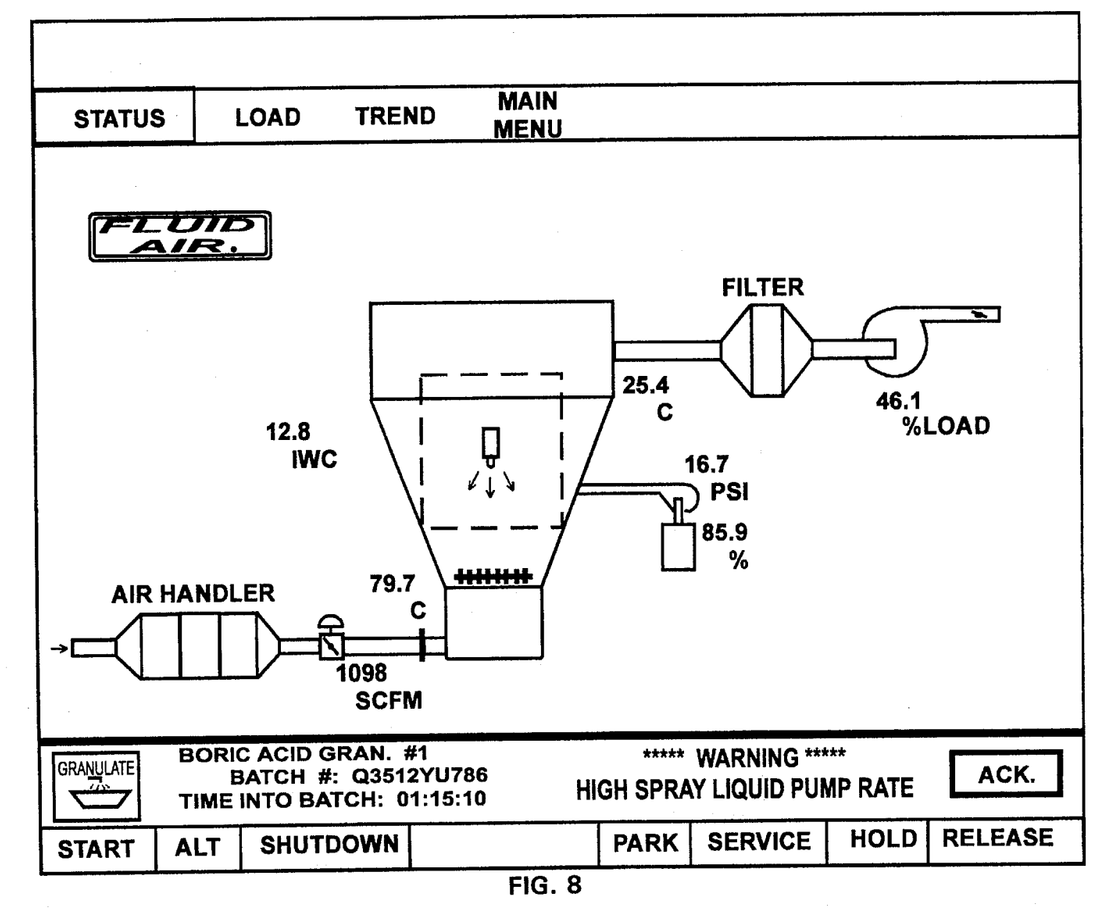
FIG. 8 is a representation of the RUN PROGRAM, PROGRAM STATUS screen, showing a sample manufacturing process flowchart, ready for the operator to monitor the ongoing batch operation.

There are three kinds of alarm conditions, depending on the nature and extent of the event or parameter excursion which triggers the alarm. A WARNING alarm causes a message to appear on the screen, which must be acknowledged by the operator by actuating the ACK. button (FIG. 8). A PARK alarm also displays a screen message, but puts the program in PARK condition. An EMERGENCY STOP (E-STOP) alarm displays a screen message, stops the program, and exits to a password screen from which the program will not re-start unless the password is entered.

The program also incorporates a HOLD function which allows the operator to interrupt and suspend the program timer if the process step represented by the then-active icon permits it. While in HOLD, the operator may enter BUILD PROGRAM to change parameters. The HOLD condition can occur within any program, and differs from PARK in that parameter modification is permitted, but not service access. When the operator has confirmed the desired parameters, the process resumes at the point where the HOLD was entered.

In the preferred embodiment, when the program has been loaded and the operator wishes to commence the process, selection of the START command temporarily exits the program to a password screen. Entry of the proper password brings up the status screen (FIG. 8), and requests the operator to insert a batch number. Upon entering a batch number, the program is enabled to start, and the operator loads the desired recipe from the stored library of recipes on the hard disk 24 or other mass data storage medium.

After the program recipe is loaded, the RUN PROGRAM screen (FIG. 7) again appears. Selecting the STATUS command brings up the status screen (FIG. 8). In the preferred embodiment, the status screen is divided into two functional sections. The upper section contains a symbolic graphical representation of the actual physical process equipment, showing its functional relationship and interconnection with other physical elements of the process. Preferably, the graphics are programmed to display in color and are animated in a way which symbolically represents the process itself, such as with moving or flashing arrows, rising and falling liquid levels, and the like. For example, certain elements of the graphic may change color as they become activated. Thus, the operator can tell at a glance which elements of equipment are running, and which are not, much as if he were observing the process equipment itself with X-ray vision.

In addition, the instantaneous value of each of the key the process variables appears on the graphic at or near the appropriate location of the actual measurement, allowing an operator to quickly scan and understand the real-time operating condition of the system.

Additional information about the program and system condition appears in the lower section of the screen. In the illustrated embodiment (FIG. 8), the currently active process icon appears on the left side, indicating to the operator where the process is in its program sequence. Next to the currently active icon is the product name, a batch number, and the elapsed time into the process for that batch. To the right in the illustration is a space for alarm messages.

Thus, according to the invention, the program provides on-screen indication to the operator of the instantaneous real-time status of the manufacturing equipment and process variables, throughout the running of the process. In addition, as described further in Step 6 below, it shows the operator the trends over time for each important process variable as the process proceeds. Further, it enables the operator to effect temporary changes in the process variable setpoints.

Step 6: Monitoring the Program

Figure 9:
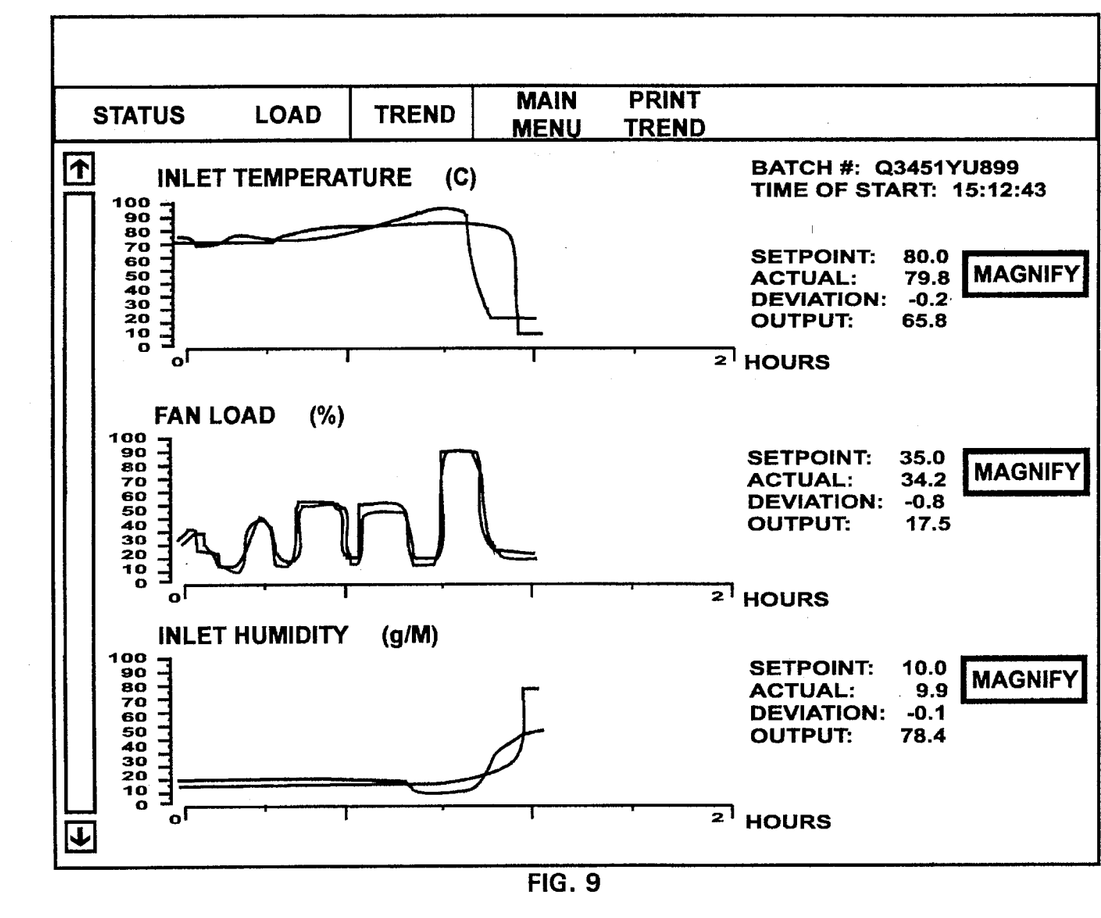
FIG. 9 is a representation of the RUN PROGRAM, STATUS PROGRAM, TREND PROGRAM function screen, showing trend graphs and actual values for three typical process parameters.
Figure 10:
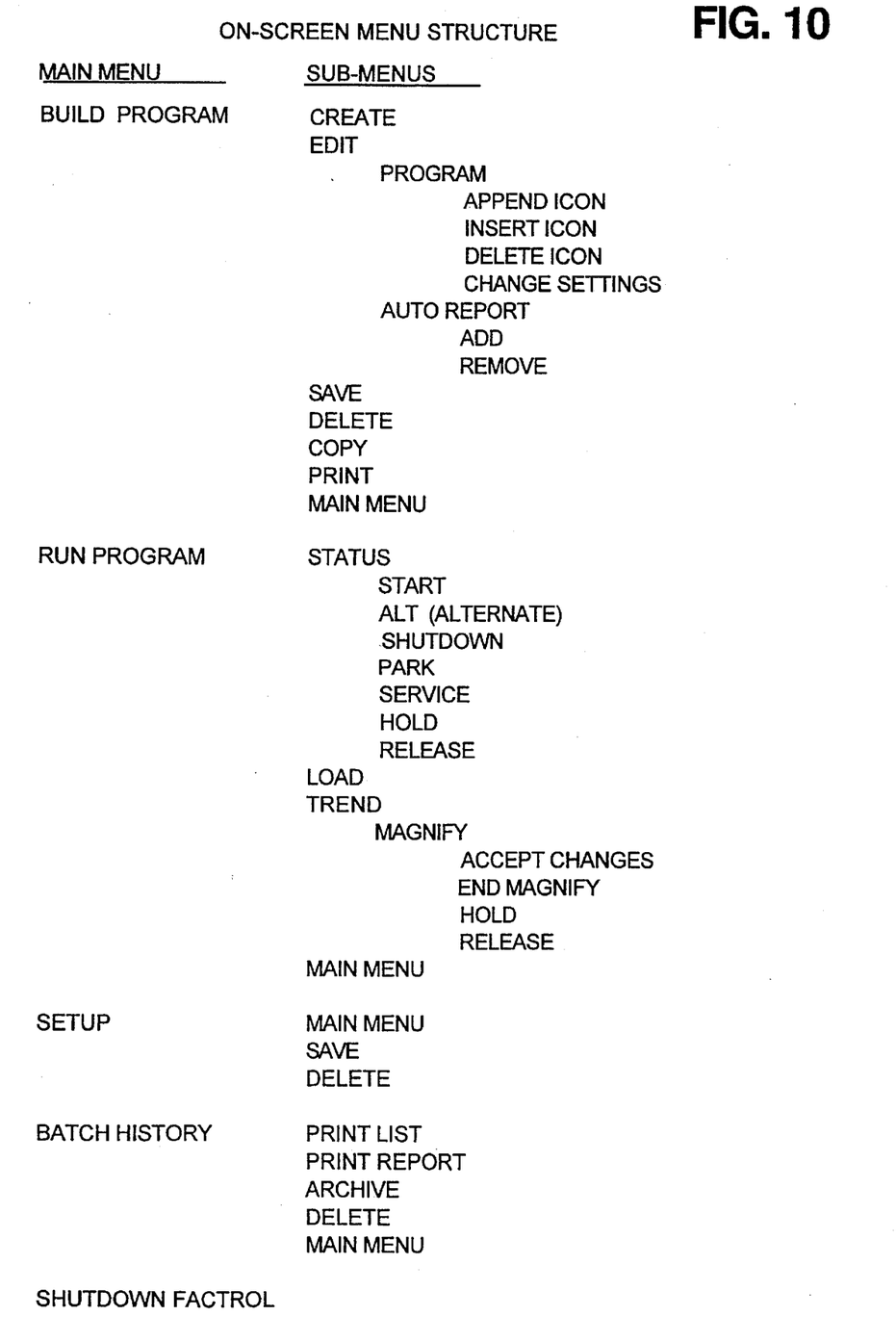
FIG. 10 is a chart of the menu structure of a commercial embodiment of the present invention which is available from Fluid Air, Inc. of Naperville, Ill. under the trademark FACTROL, from which each of the screens of FIGS. 4–9 has been selected.

Once the process is initiated using the START command, the operator monitors its status from the status screen (FIG. 8). As a further feature of the invention, trends in important process variables are also monitored in graphical form on a trend screen (FIG. 9). This screen is accessed from the status screen by clicking on the TREND command. In the illustrated embodiment the trend screen displays the current trend, or time history, of three selected process variables, which in this case are inlet temperature, fan load and inlet humidity. Each variable is displayed with its setpoint, current value, and recent history, with the graphs moving like strip charts from left to right so that the current instantaneous value is at the left edge of the chart, as if it were a pen recorder.

Actual current numerical values are shown in text boxes to the right of the moving graphs. If more than three variables are to be tracked for trends, a conventional up/down on-screen scroll bar allows the operator to bring the other trend graphs to the screen by scrolling up or down in page sets of three.

The TREND screen also includes a MAGNIFY command button which brings up a magnified trend screen (enlarging the data on a shorter time base). The MAGNIFY trend screen (not shown) also includes a menu bar permitting the operator to END MAGNIFY (return to TREND screen, HOLD (previously explained), RELEASE (release HOLD to resume normal operation).

While in HOLD, the setpoint of any given parameter may be temporarily changed by the operator, but the changes will not be written to the storage medium, and the program will revert to its original values the next time it is loaded.

Step 7: Shutting Down the Control Process

To shut down the control process using the control system of the invention, the operator selects or clicks on the SHUTDOWN FACTROL command button from the Main Menu (FIG. 4). The program again diverts to a password screen and requires entry of an acceptable password before it will permit termination of the control process and exiting of the program.

The present invention provides all of the above-described advantages and therefore fulfills each of the objectives first set forth herein. As can be readily ascertained by those skilled in the art, the present invention lends itself to change and modification in a variety of ways, none of which would limit the scope of the invention.

What is claimed is:

1. A control system for creating a recipe for and controlling a variable manufacturing process comprised of a plurality of discrete process elements performed on manufacturing equipment, comprising:

display means including a digital computer for creating and displaying icons on a video display terminal, wherein each icon depicts with a single graphical representation a plurality of process elements, some of which may have variable process and alarm setpoints;

first selection means for an operator to select, manipulate, and arrange selected icons on the display terminal in an array from a library of icons on the display terminal, said icons being predetermined for a particular physical process equipment to be controlled, thereby allowing the operator the latitude to place the selected icons in any desired order in the array representing the sequential order of the recipe for carrying out the process elements represented by the icons to accomplish the manufacturing process without having to reprogram any underlying programmable controller programs;

second selection means for an operator to adjust the variable process setpoints associated with each selected icon and its associated process elements; and means for interpreting the information represented by the icon array with its selected process setpoints, and applying it to control the manufacturing equipment for accomplishing the manufacturing process.

2. The control system of claim 1 further including control means for obtaining from the manufacturing process equipment the current value of each process element parameter associated with each icon, comparing said value with the selected value for such parameter, and applying a control input to the process equipment to adjust the current parameter value toward the selected parameter value.

3. The control system of claim 2 wherein said control system also comprises:

means for gathering, logging and storing data;

means for allowing access by other third party computer programs to the data by storing said data in formats conforming to industry accepted standards; and means for displaying the data on the video display device.

4. The control system of claim 1 wherein the first selection means further comprises:

a library of graphical icons, each of which is a metaphor for a process step and comprises a database subset of information, retrievably stored in standard database format in the data storage means of the control software;

means for retrieving all or a portion of the library of icons on the video display device;

means for selecting an icon from the library;

means for creating and editing a linked series of selected icons in a linear fashion, including means for sequentially inserting and deleting icons in said linked series; and means for displaying the linked series of selected icons on the visual display device.

* * * * *